2,726,262

PROCESS FOR THE PREPARATION AND PURIFICATION OF MONOCYCLIC AROMATIC POLYCARBOXYLIC ACIDS OR MIXTURES THEREOF

Otto Grosskinsky, Walter Thurauf, Anton Benning, George Huck, and Josef Ewers, Dortmund-Eving, Germany, assignors to Bergwerksverband zur Verwertung von Schutzrechten der Kohlentechnik G. m. b. H., Dortmund-Eving, Germany No Drawing. Application August 21, 1951,
Serial No. 243,001

Claims priority, application Germany August 24, 1950

6 Claims. (Cl. 260—515)

The present invention relates to an improved process for the preparation and purification of monocyclic aromatic polycarboxylic acids or mixtures thereof and more particularly, acids derived from the thermal oxidation of solid mineral combustible materials.

Monocyclic aromatic polycarboxylic acids (benzene derivatives) or mixtures thereof can be prepared by the thermal oxidation of fossils or recent combustible materials or their products and residues of carbonization, with nitric acid and subjecting the resultant products of oxidation to a subsequent treatment with alkaline oxidizing agents, such as sodium hypochlorite. By such procedure, it is possible to obtain mixtures of essentially monocyclic polycarboxylic acids of low molecular weight having a light and pleasing appearance which have utility as plasticizers, and as starting materials in the manufacture of lacquers, films and pharmaceutical preparations. In such latter preparations using comparatively small amounts of materials, the expenses for the aforesaid subsequent treatment of the primary oxidation products may be only of secondary consideration, but in the treatment of relatively large amounts for the purpose of making commercial products the economic factors are of such consequence that a cheaper and simpler method of subsequent treatment is desirable.

Consequently, applicant has developed a novel and economical process of making monocyclic aromatic polycarboxylic acids such as $C_6H_3(COOH)_3$, $C_6H_2(COOH)_4$, $C_6H(COOH)_5$, $C_6(COOH)_6$, and the like, by treating the aforesaid combustibles with nitric acid at elevated temperatures and subsequently subjecting the reaction product to an essentially physical treatment in order to separate the monocyclic aromatic polycarboxylic acids formed from the dark-colored impurities, thus avoiding the employment of larger quantities of expensive additional chemical agents in working up the crude reaction products. The step of separating the monocyclic aromatic polycarboxylic acids must be performed in such a manner that these acids are obtained free from mineral impurities introduced into the process by the mineral constituents of the combustibles. The aforesaid separating process is conducted in such a manner that the dark-colored carbonaceous impurities and the mineral impurities are obtained in two different stages and separated from each other, the dark-colored residual impurities being returned to the nitric acid oxidizing process admixed with fresh raw material.

Accordingly, an object of the present invention is to provide an improved and economical process for the manufacture of monocyclic aromatic polycarboxylic acids.

Another object of this invention is the development of a novel process of producing substantially pure monocyclic aromatic polycarboxylic acids.

Still another object is the development of a novel process of oxidizing combustibles in the production of substantially pure monocyclic aromatic polycarboxylic acids.

Further objects and advantages of the present invention will be apparent from the following description.

Our invention consists in treating solid mineral combustibles, such as hard coal, lignite, peat or the like, or the products or residues of their carbonization, with nitric acid at elevated temperature and, if necessary in a closed vessel under superatmospheric pressure. Subsequently the residual nitric acid is removed from the reaction mixture by distillation so that a practically dry or, at least, pulpy residue remains. This residue is then digested with water, suitable by shaking or agitating at room temperature. Hereby the monocyclic aromatic polycarboxylic acids, such as melophanic acid, pyromellitic acids, trimellitic acid, hemimellitic acid, etc., formed in the oxidation are completely or almost completely dissolved, whereas the dark-colored by-products remain undissolved and can be easily separated by filtration. The filtrate may be evaporated immediately or is first subjected to a decoloring process, such as by treating with decoloring carbon or other adsorbing agents, such as infusorial silica, silica-gel, and the like. In order to destroy the last residual dark-colored contaminating substances the filtrate can also be subjected to an oxidizing action by introducing small amounts of chlorine or hydrogen peroxide. Only small amounts of these discoloring agents are required, thereby resulting in the additional advantage of adding no fixed chemicals capable of contaminating the filtrate. If aromatic nitrogen compounds are present in the filtrate, these substances can be precipitated as potassium salts prior to evaporation, or they are removed by extraction or distillation.

After the purified filtrate is evaporated or sprayed in vacuo, a cream-colored dry crystalline mass is obtained consisting essentially of a mixture of monocyclic aromatic polycarboxylic acids, available for the aforesaid commercial and pharmaceutical purposes.

Accordingly, the removal of the undesired dark-colored by-products is effectuated essentially in a physical manner, namely by means of a selective dissolving process and subsequent filtration. The amount of water to be added to the residue remaining after distilling off the nitric acid must be sufficient to completely dissolve the monocyclic aromatic polycarboxylic acids. Generally about 10 to 15 parts (by weight) water will be required for 1 part of the residue remaining after distilling off the nitric acid.

We have found furthermore that in order to achieve the greatest possible yields the choice of a suitable starting material is important. Very favorable results are obtained when starting from flame coals rich in gas or their low temperature coke. Other excellent starting materials are hard coals containing at least about 19% volatile matter, said hard coals having been suitably subjected prior to the major nitric acid oxidation to a preliminary oxidizing treatment with air or other oxidizing gases at a temperature below the ignition point of the combustible (about 200° to 300° C). This preoxidation step is advantageous in that the subsequent nitric acid oxidation proceeds more steadily and requires less acid.

The aqueous solution of the monocyclic aromatic polycarboxylic acids may be contaminated, by small percentages of mineral constituents resulting from the ash content of the specific combustible employed. Although in many cases these impurities are not deleterious, especially when present only in very small quantities in the final products, their removal may sometimes be desirable.

Accordingly, another embodiment of this invention is the subjection of the residue resulting from the evaporation of the aqueous solution to a secondary digestion at room temperature with a low boiling ketone, this digestion being carried out essentially under the same conditions as that performed with water. Acetone or butanone may be preferably employed although other organic compounds of the other type, such as dioxanes (di-ethylene-dioxide or methylene-propylene-dioxide) may also be employed. In this secondary digestion the mineral constituents remain undissolved and may be separated by filtration. The organic solvent is removed and covered by distillation. In accordance with this procedure, it is possible to remove the dark-colored organic contaminate and the mineral constituents separately in two different stages, this being of importance in the event it is necessary to recover the dark-colored substances free of mineral impurities.

Still another embodiment of this invention resides in the omission of the preliminary digestion with water and the substitution therefor of the ketone digestion step. As a result of this digestion step, the mineral substances remain undissolved together with the dark-colored organic impurities.

A further embodiment of the invention is the addition of a chlorinated low boiling hydrocarbon liquid such as chloroform or carbon tetrachloride, in order to intensify the selective dissolving property of the ketone solvent. Chlorinated hydrocarbons of the aforesaid kind do not adversely affect the solubility of the monocyclic aromatic polycarboxylic acids in ketones, whereas the low solubility of the dark-colored impurities in ketones is effectively reduced.

Evidently the immediate digestion with a ketone without preliminary digestion with water is simpler since the digestion takes place only once. However, larger quantities of organic solvent are required, thereby resulting in greater losses of the solvent due to evaporation. The choice of digestion steps is dependent on the operating conditions and the nature of the nitric acid residue obtained.

Whenever treating the solution of the monocyclic aromatic polycarboxylic acids with oxidizing decoloring agents, such as $Cl_2$, $H_2O_2$ etc, it is desirable to carry out this treatment in the aqueous stage, if such a stage is provided. On the other hand, there is a certain risk that the decoloring agents react with the organic liquids themselves, thus altering these liquids in an undesirable manner and causing an unnecessarily high waste of decoloring agent. When employing ketones this risk will be less acute since ketones are known to be pretty stable against oxidizing agents.

Employing too much organic solvent should be avoided as well as the addition of too much water when carrying out the digestion. When immediately digesting with actone, the crude primary product left after distilling off the residual nitric acid requires about 5 liters acetone per kg. of said primary product.

Still another embodiment of this invention resides in subjecting the mixture of monocyclic aromatic polycarboxylic acids to a final purifying process by esterification either in the presence of an accelerating agent, such as a mineral acid, or in the absence of such an agent. Low boiling point alcohols are employed because high boiling alcohols will yield esters of correspondingly high boiling points which can only be distilled with difficulty even when applying extremely high vacuum. Small quantities of non-esterified acid constituents, acid esters and the like are suitably removed prior to distilling the mixture of esters by shaking with a mild base, such as aqueous sodium bicarbonate or milk of lime, in the presence of ether.

The following examples are additionally illustrative of the present invention and are not to be construed as limiting the scope thereof. All parts are by weight.

*Example I*

In an autoclave, 100 parts pulverised gasflame coal are treated for 6 hours with six times the weight nitric acid (sp. gr. 1.2) at 160° C. and 6 atmospheres pressure. Subsequently the residual nitric acid is practically completely removed by evaporating and the residue agitated for 1 hour with 1500 parts water at room temperature. The dark-colored insoluble residue is filtered off and the filtrate evaporated, yielding 50 parts of a light-yellow product suitable for the manufacture of lacquers, plasticizers and pharmaceutical preparations (acid value= 600). In order to determine the type of acids present, the mixture of acids is esterified with methyl alcohol. The distillation of the mixture of esters in a high vacuum yields fractions of the methyl esters of the following acids identified according to known methods; trimellitic acid, pyromellitic acid, mellophanic acid, benzene pentacarboxylic acid, hemimellitic acid, phthalic acid, and some succinic acid. The total weight of these acids amounts to 40–45% of the coal employed.

*Example II*

100 parts of pulverised gasflame coal are treated with nitric acid according to the first example. The reaction mixture is concentrated by evaporating and the pulpy residue agitated for 1 hour with 1000 parts water at room temperature. After filtering off the insoluble substances the filtrate is boiled with 10 parts of decoloring carbon, subsequently filtered again and evaporated, leaving a purified mixture of acids such as cited in the foregoing example.

*Example III*

A bituminous coal containing 27% volatile matter is preoxidised with air. 100 parts of the preoxidised and pulverised material are treated with nitric acid according to the first example. After evaporating the dry residue is agitated for 1 hour with 2000 parts water at room temperature and filtered. The filtrate is heated to about 30° C. whereupon gaseous chlorine is introduced. Then the liquid is evaporated, leaving a light-colored mixture of acids of the same composition as obtained according to the foregoing examples.

*Example IV*

100 parts of an air-oxidised and pulverised gas-flame coal are treated with nitric acid and subjected to evaporation as described in the first example. The residue is agitated with 500 parts water at a temperature of about 60–90° C. whereupon the aqueous suspension is extracted with benzene. After tapping off the benzene solution the aqueous liquid is diluted to twice its volume with water, filtered and evaporated, yielding a mixture of acids corresponding to that obtained according to the first example, but free from aromatic nitrogen compounds.

*Example V*

100 parts pulverized gasflame coal are treated with nitric acid (sp. gr. 1.2) at 150° C. and 5 atmospheres pressure for 8 hours. After distilling off the residual nitric acid the residue is agitated several hours with 15 times the quantity of water. Subsequently the liquid is filtered, evaporated, the residue agitated some minutes with 4 times the quantity of acetone, filtered and evaporated again. 50 parts of a mixture of monocyclic polycarboxylic acids are obtained (ash content 0.1–0.2%).

*Example VI*

100 parts of a low temperature (450° C.) coke are treated for 10 hours with nitric acid (sp. gr. 1.2) at 130° C. and 6 atmospheres pressure whereupon the residual nitric acid is removed by distillation. The residue obtained is agitated about 1 hour with thrice the quantity of acetone to which 50% chloroform, based on the weight of the acetone employed, have been added. After filtering off the insoluble constituents and evaporating the filtrate, 45 parts of a mixture of monocyclic polycarboxylic acids are obtained (ash content 0.1–0.2%).

*Example VII*

100 parts of a bituminous coal containing 26% volatile matter are treated for 3 hours with nitric acid (sp. gr.

1.2) at 150° C. and 5 atmospheres pressure. After removing the nitric acid by distilling off or spraying in vacuo the residue is agitated a short time with 5 times its weight of butanone. The insoluble constituents are then filtered off and the filtrate is evaporated. The residue so obtained is boiled at the reflux condenser with thrice its quantity of butyl alcohol, the reaction water being invariably tapped off by means of a water trap. The liquid is subsequently evaporated, diluted with ether, and agitated with aqueous sodium bicarbonate. Then the mixture of esters is distilled in a high vacuum. 75–80 parts of a light-yellow mixture of monocyclic polycarboxylic acid esters are obtained.

While the invention has been described with reference to specific embodiments, it will be apparent to those skilled in the art that various modifications may be made and equivalents substituted therefor without departing from the principles and true nature of the present invention.

What is claimed by Letters Patent is:

1. A process of producing monocyclic aromatic polycarboxylic acids, comprising the steps of treating carboniferous matter at elevated temperature with nitric acid so as to form a reaction mass including dark colored organic impurities and light colored monocyclic aromatic polycarboxylic acids; distilling-off the residual nitric acid from the thus formed reaction mass; digesting the thus remaining reaction mass with a solvent selected from the group consisting of water and low boiling point ketones in an amount sufficient to cause dissolution of said light colored monocyclic aromatic polycarboxylic acids in said solvent while preventing dissolution of said dark colored organic impurities therein; separating the undissolved dark colored organic impurities from the thus formed solution; evaporating said solution; and recovering a mixture of substantially pure light colored monocyclic aromatic polycarboxylic acids.

2. A process of producing monocyclic aromatic polycarboxylic acids, comprising the steps of preoxidizing carboniferous matter with air at elevated temperature; treating the thus preoxidized carboniferous matter at elevated temperature with nitric acid so as to form a reaction mass including dark colored organic impurities and light colored monocyclic aromatic polycarboxylic acids; distilling-off the residual nitric acid from the thus formed reaction mass; digesting the thus remaining reaction mass with a solvent selected from the group consisting of water and low boiling point ketones in an amount sufficient to cause dissolution of said light colored monocyclic aromatic polycarboxylic acids in said solvent while preventing dissolution of said dark colored organic impurities therein; separating the undissolved dark colored organic impurities from the thus formed solution; evaporating said solution; and recovering a mixture of substantially pure light colored monocyclic aromatic polycarboxylic acids.

3. A process of producing monocyclic aromatic polycarboxylic acids, comprising the steps of preoxidizing carboniferous matter with air at elevated temperature; treating the thus preoxidized carboniferous matter at elevated temperature with nitric acid so as to form a reaction mass including dark colored organic impurities and light colored monocyclic aromatic polycarboxylic acids; distilling-off the residual nitric acid from the thus formed reaction mass; digesting the thus remaining reaction mass with water in an amount sufficient to cause dissolution of said light colored monocyclic aromatic polycarboxylic acids in said water while preventing dissolution of said dark colored organic impurities therein; separating the undissolved dark colored organic impurities from the thus formed solution; evaporating said solution; and recovering a mixture of substantially pure light colored monocyclic aromatic polycarboxylic acids.

4. A process of producing monocyclic aromatic polycarboxylic acids, comprising the steps of treating carboniferous matter at elevated temperature with nitric acid so as to form a reaction mass including dark colored organic impurities and light colored monocyclic aromatic polycarboxylic acids; distilling-off the residual nitric acid from the thus formed reaction mass; digesting the thus remaining reaction mass with water in an amount sufficient to cause dissolution of said light colored monocyclic aromatic polycarboxylic acids in said water while preventing dissolution of said dark colored organic impurities therein; separating the undissolved dark colored organic impurities from the thus formed solution; evaporating said solution; subjecting the thus formed residue to a secondary digestion with a low boiling ketone so as to dissolve said light colored monocyclic aromatic polycarboxylic acids while preventing dissolution of any mineral constituents still present in said residue; evaporating the thus formed solution; and recovering a mixture of substantially pure light colored monocyclic aromatic polycarboxylic acids.

5. A process of producing monocyclic aromatic polycarboxylic acids, comprising the steps of preoxidizing carboniferous matter with air at elevated temperature; treating the thus preoxidized carboniferous matter at elevated temperature with nitric acid so as to form a reaction mass including dark colored organic impurities and light colored monocyclic aromatic polycarboxylic acids; distilling-off the residual nitric acid from the thus formed reaction mass; digesting the thus remaining reaction mass with a low boiling point ketone in an amount sufficient to cause dissolution of said light colored monocyclic aromatic polycarboxylic acids in said ketone while preventing dissolution of said dark colored organic impurities therein; separating the undissolved dark colored organic impurities from the thus formed solution; evaporating said solution; and recovering a mixture of substantially pure light colored monocyclic aromatic polycarboxylic acids.

6. A process of producing monocyclic aromatic polycarboxylic acids, comprising the steps of preoxidizing bituminous coal containing more than about 19% volatile matter with air at elevated temperature; treating the thus preoxidized bituminous coal at elevated temperature with nitric acid so as to form a reaction mass including dark colored organic impurities and light colored monocyclic aromatic polycarboxylic acids; distilling-off the residual nitric acid from the thus formed reaction mass; digesting the thus remaining reaction mass with a solvent selected from the group consisting of water and low boiling point ketones in an amount sufficient to cause dissolution of said light colored monocyclic aromatic polycarboxylic acids in said solvent while preventing dissolution of said dark colored organic impurities therein; separating the undissolved dark colored organic impurities from the thus formed solution; evaporating said solution; and recovering a mixture of substantially pure light colored monocyclic aromatic polycarboxylic acids.

References Cited in the file of this patent

UNITED STATES PATENTS

| | | |
|---|---|---|
| 2,176,348 | Juettner | Oct. 17, 1939 |
| 2,193,337 | Leicester | Mar. 12, 1940 |
| 2,461,740 | Kiebler | Feb. 15, 1949 |
| 2,555,410 | Howard | June 5, 1951 |

FOREIGN PATENTS

| | | |
|---|---|---|
| 214,252 | Germany | Oct. 8, 1909 |
| 268,006 | Great Britain | Mar. 14, 1927 |
| 223,537 | Switzerland | Dec. 1, 1942 |
| 879,182 | France | Feb. 16, 1943 |
| 883,641 | France | July 9, 1943 |
| 231,062 | Switzerland | May 1, 1944 |
| 635,088 | Great Britain | Apr. 5, 1950 |

OTHER REFERENCES

MacArdle: "Solvents in Synthetic Org. Chem." (Van Nostrand), page 21, 1925.